US009010779B1

(12) United States Patent
Palmer

(10) Patent No.: US 9,010,779 B1

(45) Date of Patent: Apr. 21, 2015

(54) APPARATUS FOR LIFTING, STABILIZING, AND MOBILIZING AN ELDERLY OR DISABLED PERSON

(71) Applicant: Carl Palmer, St. George, UT (US)

(72) Inventor: Carl Palmer, St. George, UT (US)

( * ) Notice: Subject to any disclaimer, the term of this patent is extended or adjusted under 35 U.S.C. 154(b) by 0 days.

(21) Appl. No.: 14/137,207

(22) Filed: Dec. 20, 2013

(51) Int. Cl.

| | |
|---|---|
| ***B60M 1/00*** | (2006.01) |
| ***A61H 3/04*** | (2006.01) |
| ***A61G 7/10*** | (2006.01) |

(52) U.S. Cl.
CPC ................ *A61H 3/04* (2013.01); *A61G 7/1017* (2013.01)

(58) Field of Classification Search
USPC ..................... 280/648; 5/81 R, 83, 86, 87, 89
See application file for complete search history.

(56) References Cited

U.S. PATENT DOCUMENTS

| | | | | |
|---|---|---|---|---|
| 2,792,052 | A * | 5/1957 | Johannesen | 297/5 |
| 4,918,771 | A * | 4/1990 | James | 5/87.1 |
| 5,411,044 | A * | 5/1995 | Andolfi | 135/66 |
| 6,568,002 | B1 * | 5/2003 | Liljedahl | 5/86.1 |
| 2005/0283906 | A1 * | 12/2005 | Summers | 5/86.1 |

* cited by examiner

*Primary Examiner* — John Walters
*Assistant Examiner* — James Triggs
(74) *Attorney, Agent, or Firm* — Gurr & Brande, PLLC; Robert A. Gurr

(57) ABSTRACT

In one embodiment, an elderly assistance apparatus comprises a frame, wheels, and a lever mechanism. The lever is comprised of caregiver leverage handles, patient lifts, and a fulcrum. In another embodiment the elderly assistance apparatus may comprise patient stabilizers. In one embodiment, the stabilizers are mounted crutches.

13 Claims, 6 Drawing Sheets

APPARATUS FOR LIFTING, STABILIZING, AND MOBILIZING AN ELDERLY OR DISABLED PERSON

TECHNICAL FIELD

The present technology relates to devices and apparatuses to assist the elderly or disabled. More particularly, the present technology relates to a mobile mechanical lift for assisting the elderly or disabled to rise up from, or lower down to, a seated or lying position.

BACKGROUND

One of the biggest concerns for the elderly and those with disabilities is the risk of falling after standing up from a seated or lying position. Even if they are able to get to their feet, the risk of losing their balance and falling is very high. Ordinary walkers rely on the arm and wrist strength of a user and can be unsafe as the user pushes the walker in an attempt to walk. As such, many users are relegated to a wheelchair, despite having the desire to walk, because of the lack of support and instability of an ordinary walker. Even simple transfers from bed to chair, or chair to bed can be difficult and highly risky tasks to the elderly or disabled individual. Even with the assistance of a caregiver, the task is still very difficult. The caregiver not only struggles to lift the person, but it may lead to injuries for both parties. Current methods involve the use of chairs or beds that are either hydraulic or electric that assist a person to stand. Other methods involve wall-mounted hand rails, ceiling-mounted ropes or cables, etc. However, these methods are stationary and some can be very expensive. There is a need for a device that can not only assist a person to rise up, provide complete support and balance, but that also affords the user stability when walking. The present invention seeks to solve these and other problems.

SUMMARY OF EXAMPLE EMBODIMENTS

In one embodiment, an elderly assistance apparatus comprises a frame, wheels, and a lever mechanism. The lever is comprised of caregiver leverage handles, patient lifts, and a fulcrum. In another embodiment the elderly assistance apparatus may comprise patient stabilizers.

In another embodiment, the elderly assistance apparatus further comprises extended handles for lifting someone from the floor. The elderly assistance apparatus may further comprise arm rests and hand grips, a footrest, brakes for the wheels, and walker handles.

A method of using an elderly assistance apparatus, the method comprises using a mobile lever to lift a patient by placing patient lifts under the arms of a patient; a caregiver actuating the lever by applying a downward force on the leverage handles; raising the patient to their feet; and allowing the patient to use the elderly assistance apparatus as a means of safely walking.

DETAILED DESCRIPTION OF EXAMPLE EMBODIMENTS

The following descriptions depict only example embodiments and are not to be considered limiting of its scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention. Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

For our purposes herein, an elderly, injured, or disabled person will be referred to as a "patient." This definition does not require that the person be in an institution or otherwise under licensed care; it only requires that the person desires to use the apparatus. Use of the term "elderly assistance apparatus" does not preclude the use of this apparatus by the injured or disabled and use by such persons is specifically contemplated herein. Further, a "caregiver" is herein defined to mean any person who is assisting the patient, whether holding any particular license or not.

It should be understood that the steps of any such processes or methods are not limited to being carried out in any particular sequence or arrangement. Indeed, the steps of the disclosed processes or methods generally may be carried out in various different sequences and arrangements while still falling within the scope of the present invention.

Figure 1:
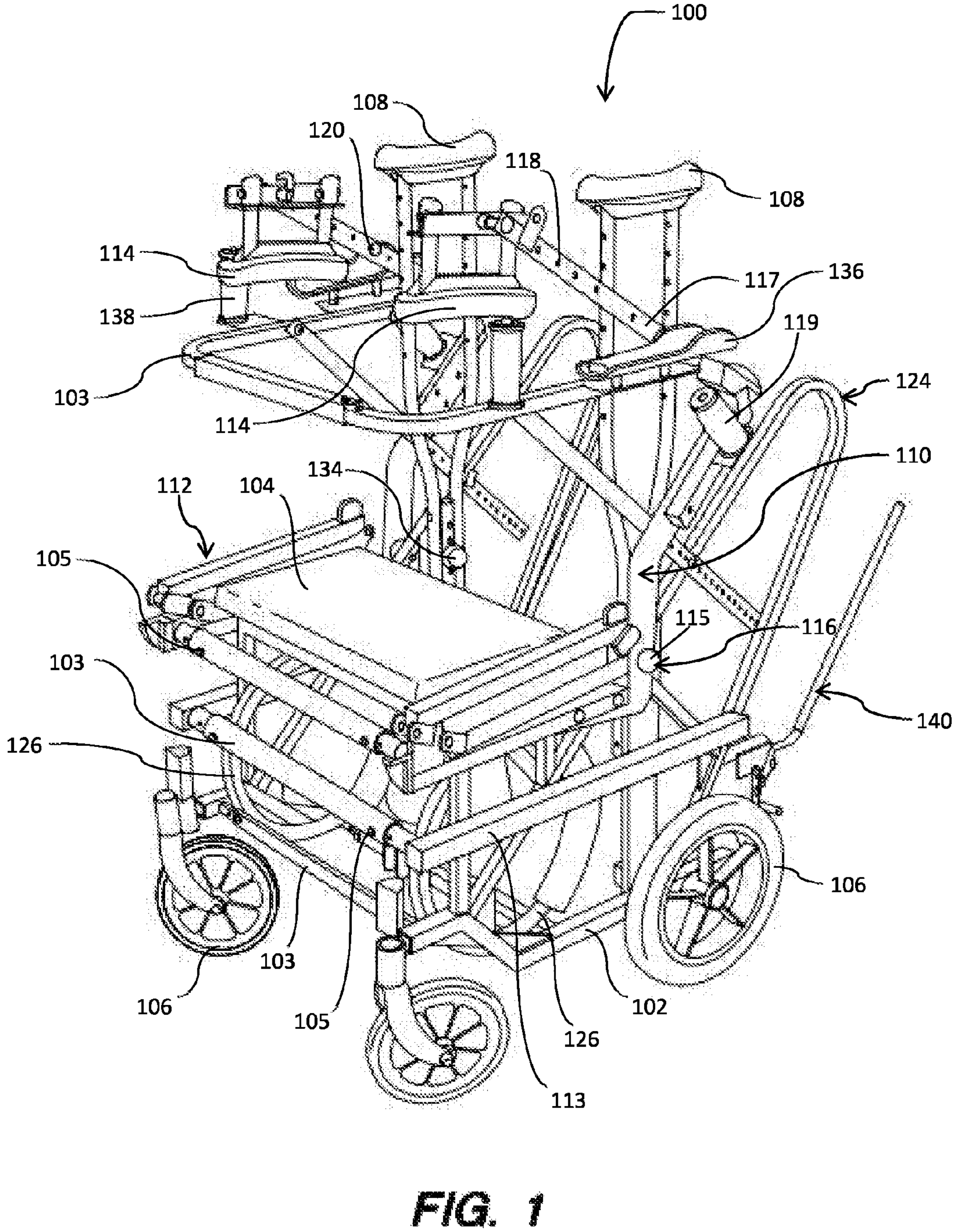
FIG. 1 is a perspective side view of an elderly assistance apparatus
Figure 2:
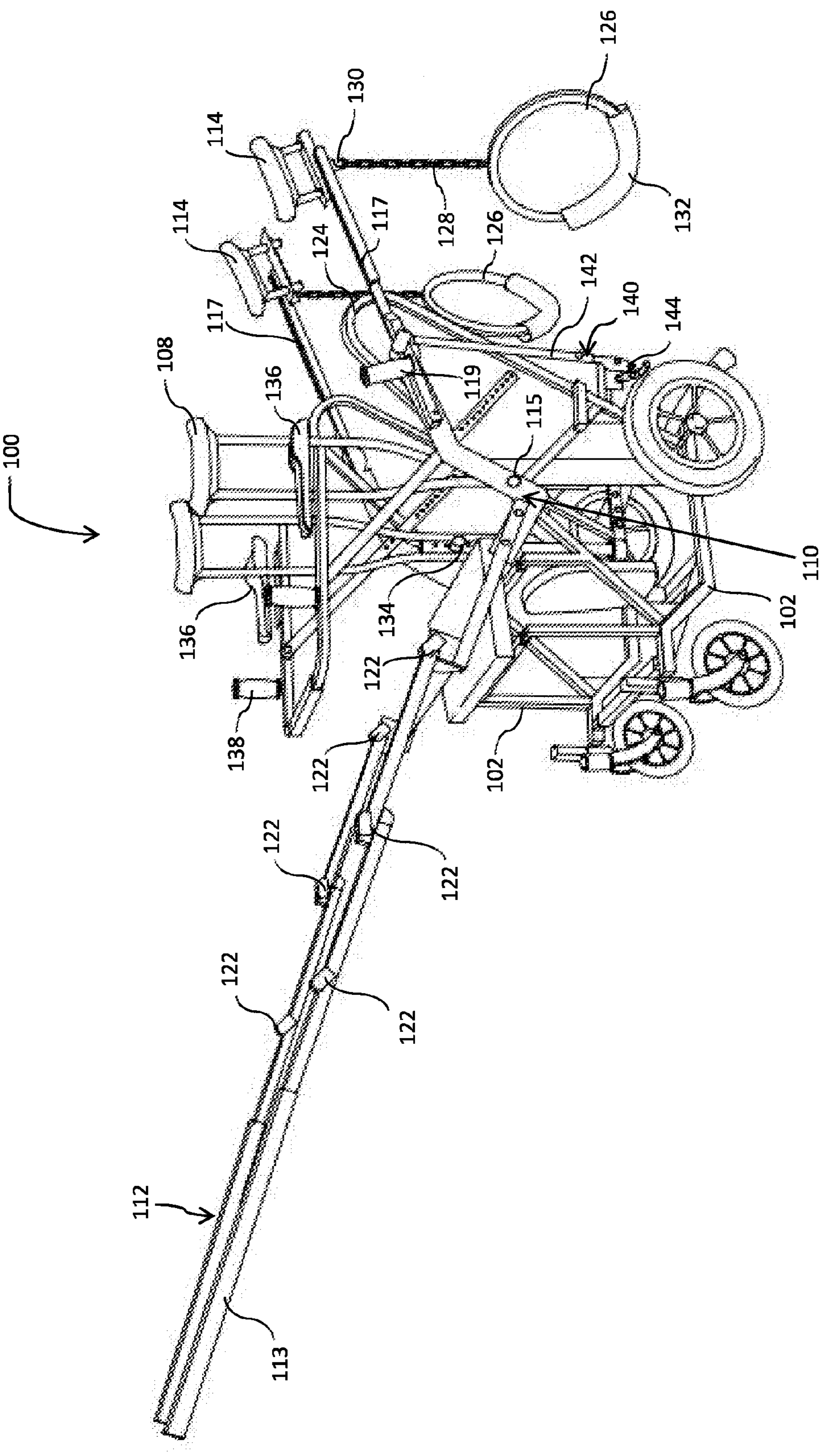
FIG. 2 is a perspective side view of an elderly assistance apparatus with leverage handles extended
Figure 3:
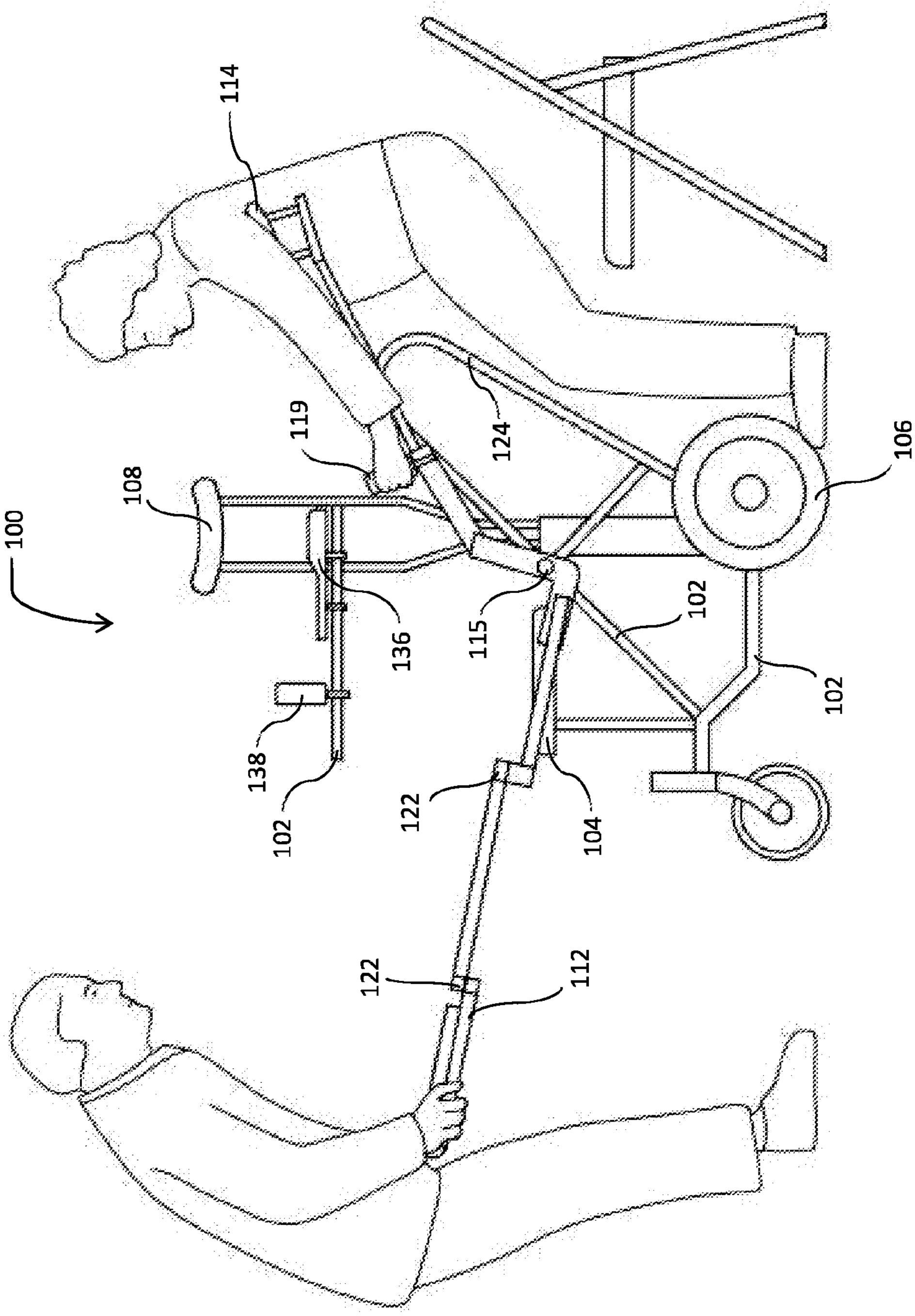
FIG. 3 is a perspective side view illustrating the elderly assistance apparatus in use to lift a person
Figure 5:
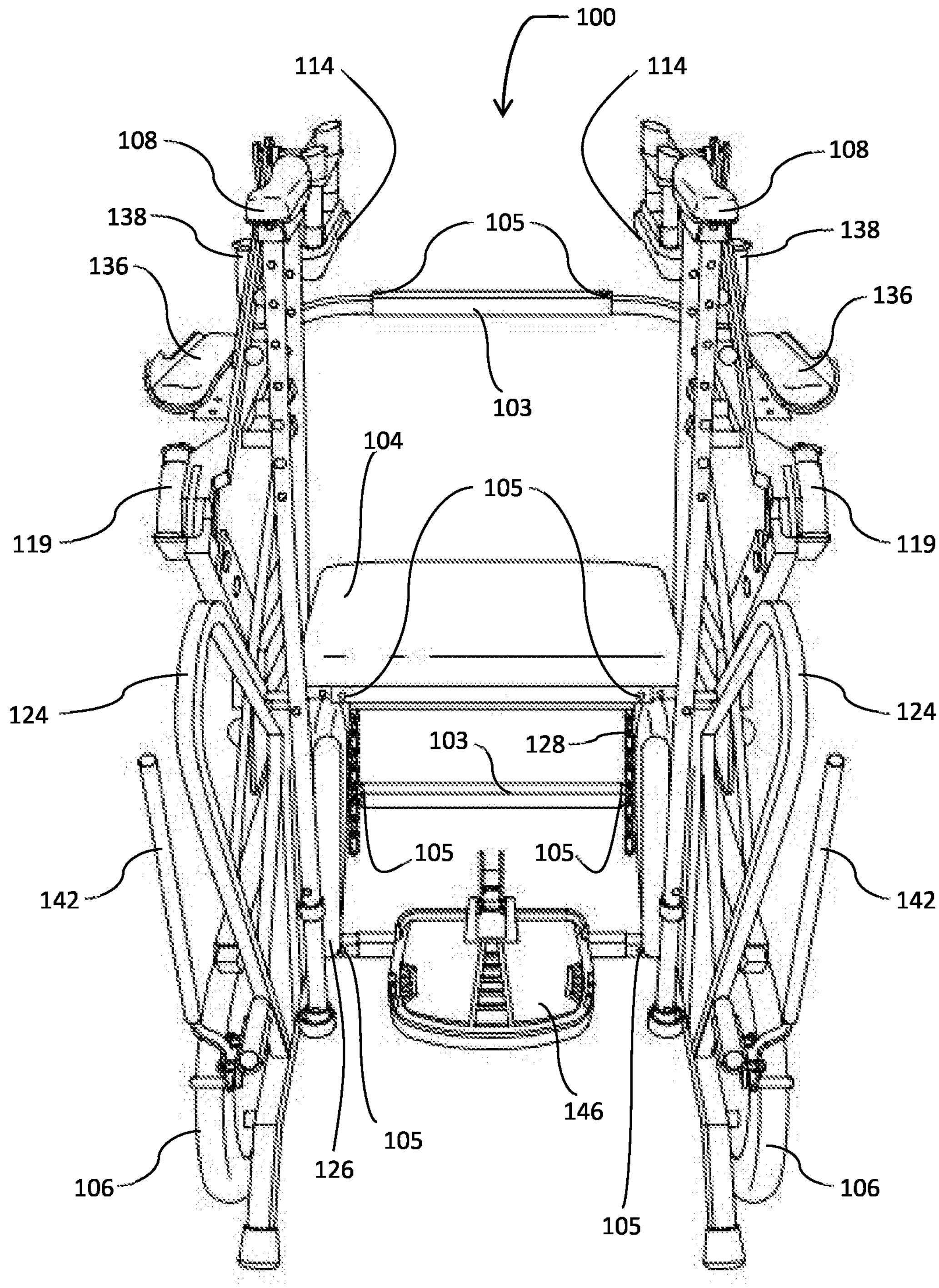
FIG. 5 is a perspective front view of an elderly assistance apparatus with a seat and footrest

In one embodiment, an elderly assistance apparatus 100 comprises a frame 102, a seat 104, wheels 106, underarm stabilizers 108, and a lever mechanism 110. The lever mechanism 110 is comprised of caregiver leverage handles 112 and patient lifts 114 with a fulcrum 116. As can be more fully seen in FIGS. 2 and 3, when a patient desires to stand from a seated position, the caregiver wheels over elderly assistance apparatus 100 to where the patient is seated. The caregiver then rotates patient lifts 114 (such as on a rotating pin, hinge, or grooves in the lift arms 117) to fit under a patient's underarms. A patient may also grasp center grips 119 while being raised, as best seen in FIG. 3. As shown in FIG. 1, patient lifts 114 are also adjustable so as to fit a variety of users by using apertures 118 with locking pins 120 (such as cotter pins) or other equivalent means, such as a bolt and nut, tongue and groove, etc. Further, the width of the elderly assistance apparatus 100 may be adjusted using a series of telescoping poles/rods 103 and locking mechanisms 105, such as spring-loaded pins, nut and bolt, or similar, as best shown in FIG. 5. Once the patient lifts 114 are in the ideal location, the caregiver places them under the armpit of the patient. As shown in FIGS. 2 and 3, the caregiver then extends leverage handles 112 so as to create a lever mechanism 110. Leverage handles 112 are made so as to be collapsible for easy transport and storage. For example, leverage handles 112 may be connected via a series of pivot points 122. The pivot points 122 may be from U-shaped brackets with locking pins or nuts and bolts, or any other substantially equivalent means for creating collapsible handles, such as telescoping poles or by incorporating the use of hinges. However, the material and joints need to be strong enough to withstand the force of a caregiver pushing them down in an effort to lift a patient. Ideal materials are metals and alloys, although plastics and carbon fibers may also be sufficient. Leverage handles 112 may also be shortened or lengthened to adjust the overall effectiveness of the lever mechanism 110. For example, the locking pins or bolts may be removed from the upper portion of leverage handles 112, allowing extension 113 to be removed. Extension 113 may then be placed in a storage position, as shown in FIG. 1. Allowing the leverage handles 112 to be extended is very useful as it creates additional leverage (i.e., a mechanical advantage), allowing a caregiver to lift greater weight with less force.

Figure 4:
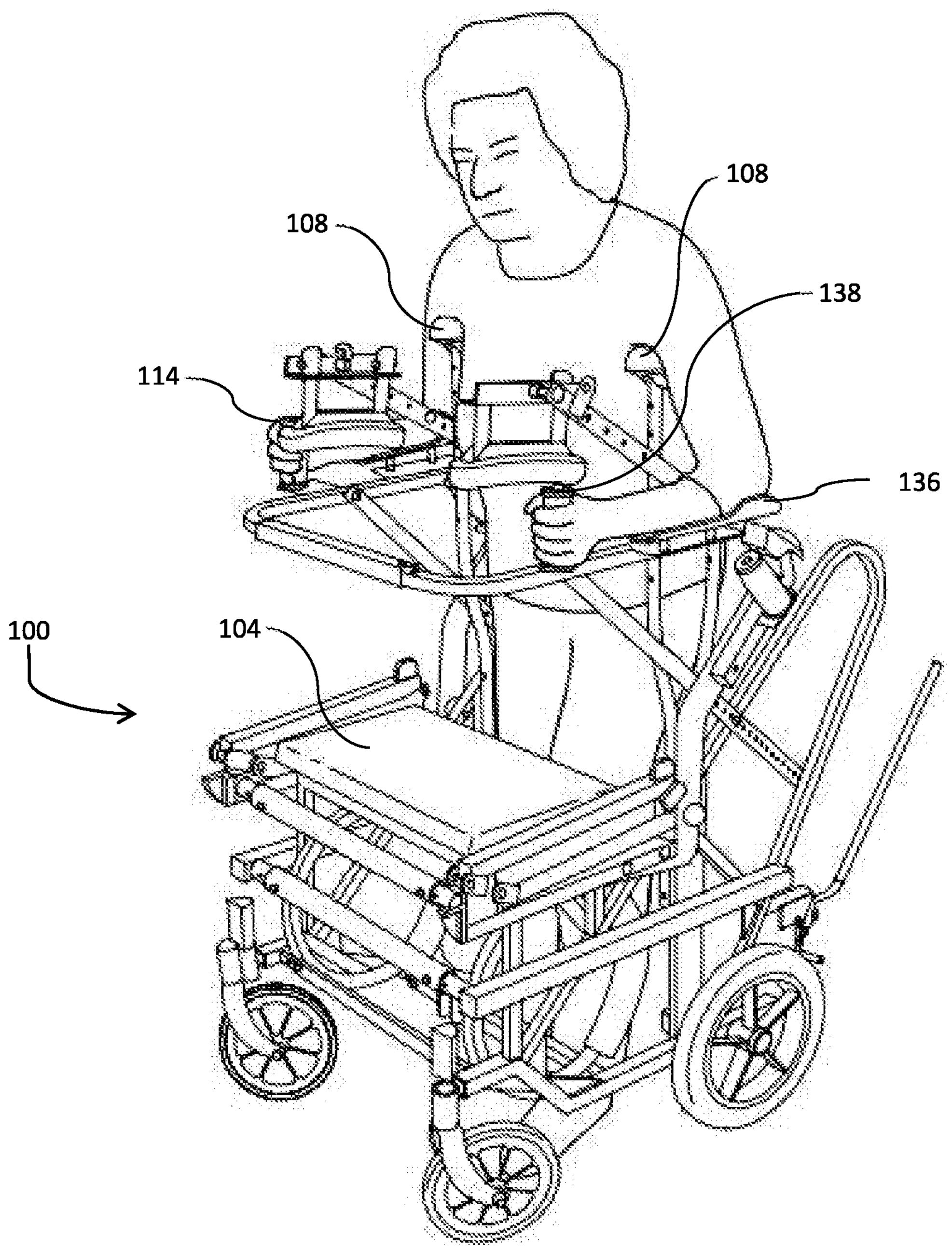
FIG. 4 is a perspective view showing a person walking with the elderly assistance apparatus

As a caregiver exerts a downward force on leverage handles 112, patient lifts 114 lift a patient upward due to fulcrum 116. The benefits of using a lever to lift something are very well known; the main benefit allowing someone to lift a heavy or difficult object with only a fraction of the energy. As shown in FIG. 4, once the patient is on their feet, they can grasp front grips 138 to stabilize themselves and begin walking. The caretaker may then fold lift handles 114 back into their original position and would likewise collapse or fold leverage handles 112. The patient is then free to use elderly assistance apparatus 100 as a walking assistance device for complete 360 degree support and mobility.

In one embodiment, extended handles 126 may be removably attachable so as to assist a patient that has trouble sitting up from a lying position or that has fallen to the ground. Extended handles may be hoops, as shown in FIG. 2, but may also be bars, hand grips, or other sufficient mechanism. An attaching means, such as chain 128, is connected to handle lifts 114 via a hook 130, carabiner, or similar. It is important to note that the materials used must withstand the weight of an adult human, so metal and alloys are preferred. However, nylon ropes or other materials may be used that are of sufficient strength. Comfort pads 132 may also be included to lessen the impact on the patient and are made from materials known in the art, such as cottons and/or foams. Once a patient is raised to a sitting position, they may then use patient lifts 114 as described above. Extended handles 126 may likewise be stored on the elderly assistance apparatus 100 as shown in FIG. 1 and FIG. 5.

In one embodiment, a patient may desire further stability when walking and will therefore walk farther forward to use underarm stabilizers 108. Underarm stabilizers 108 are similar to crutches (well known in the art) in their design and support. The height may be adjusted using height adjustment pin 134 so as to accommodate a variety of patients. The patient may further use arm rests 136 and front grips 138 for added support and comfort. Arms rests 136 are removably attachable to underarm stabilizers 108 using bolts and nuts, cotter pins, or their equivalents.

Figure 6:
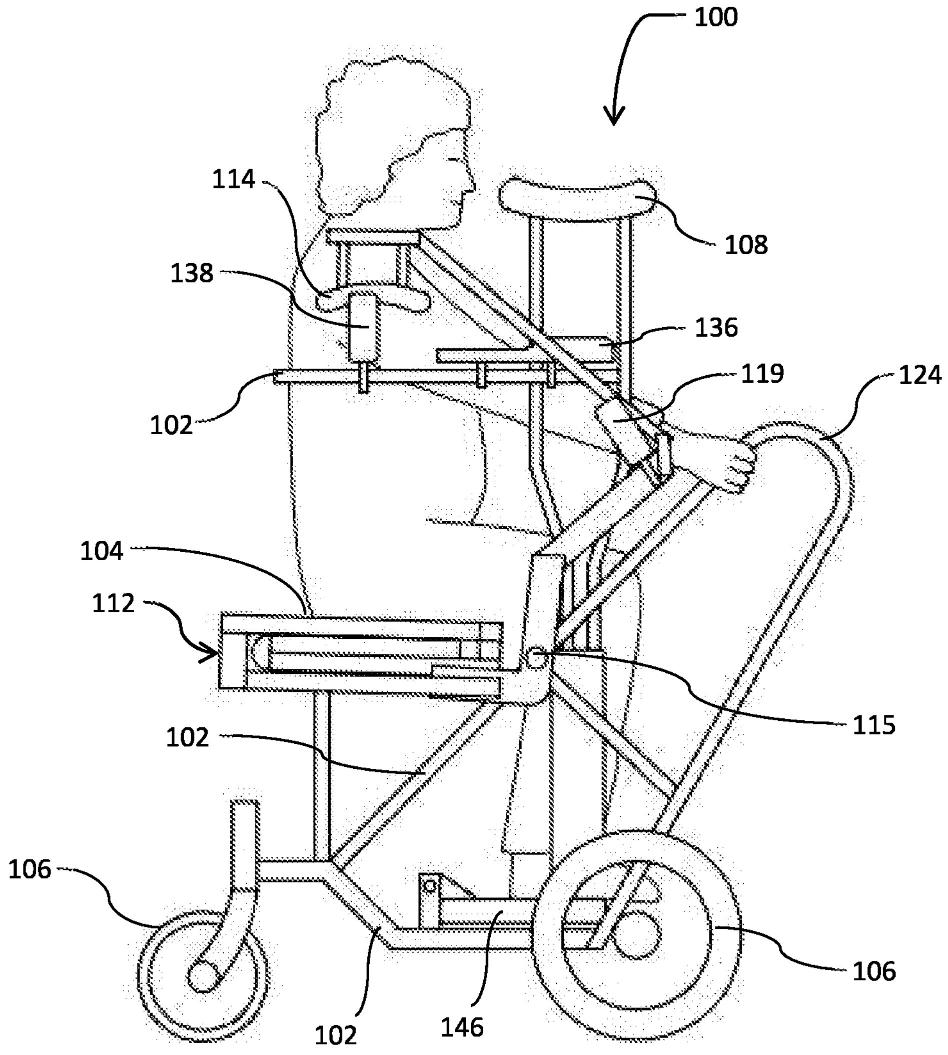
FIG. 6 is a perspective side view with a person seated on the elderly assistance apparatus

If the patient desires to rest or sit down, they may engage a brake 140. Brake 140 may be comprised of a brake handle 142 with wheel block 144. As a user actuates brake handle 142, wheel block 144 makes contact with the wheel so as to prevent it from rolling. Brake 140 is also very useful when a caregiver is lifting a patient, so that the elderly assistance apparatus 100 does not move during the process. A patient may choose to sit on seat 104 and, as seen in FIGS. 5 and 6, place their feet on footrest 146. Ideally, footrest 146 is hinged so that it can be folded upwards when not in use. It is height adjustable to fit a user, using a tongue and groove, locking pins, or other similar mechanism and is made from plastics or other suitable materials.

Elderly assistance apparatus 100 may also be easily disassembled for varied uses. For example, leverage handles 112 may be removed entirely by removing the fulcrum pins 115. This accommodates a user that is able to stand without assistance, but who still desires additional stability while walking or moving about.

What is claimed is:

1. An elderly assistance apparatus, comprising:
- a frame that is horizontally adjustable so as to accommodate varying patient sizes;
- extendable caregiver leverage handles that are operatively connected to and opposite a pair of patient lifts, creating a fulcrum for lifting a patient;
- wherein the patient lifts further comprise a first pair of hand grips to aid a patient while being raised;
- a pair of adjustable height underarm stabilizers that aid in stabilizing a patient while walking;
- a second pair of hand grips connected to a pair of arm rests;
- a pair of extended handles for raising a patient from a lying position to their feet; and
- a seat.

2. The elderly assistance apparatus of claim 1, wherein the caregiver leverage handles are foldable or otherwise collapsible.

3. The elderly assistance apparatus of claim 1, wherein the patient lifts comprise underarm supports.

4. The elderly assistance apparatus of claim 1, further comprising wheels and at least one wheel brake.

5. The elderly assistance apparatus of claim 1, further comprising a footrest.

6. The elderly assistance apparatus of claim 1, wherein the extended handles are removably attachable to the patient lift arms or lift handles.

7. The elderly assistance apparatus of claim 1, wherein at least one pair of grips are front grips.

8. A method of using an elderly assistance apparatus, the method comprising:
- using a mobile lever to lift a patient by placing patient lifts under the arms of a patient; wherein the patient lifts are operatively connected to and opposite a pair of caregiver leverage handles, creating a fulcrum for lifting a patient;
- a caregiver actuating the lever by applying a downward force on the leverage handles, which raises the patient to their feet; and
- allowing the patient to use the elderly assistance apparatus as a walker that supports them under the armpits and arms while they walk.

9. The elderly assistance apparatus of claim 1, wherein the patient lifts are foldable or otherwise collapsible.

10. The elderly assistance apparatus of claim 1, wherein the underarm stabilizers are mounted crutches.

11. The method of claim 8 further comprising the steps of lifting a patient from a lying position by using the extended handles and actuating the lever by pressing down on the leverage handles.

12. The method of claim 11 wherein the patient uses the extended handles by gripping the extended handles.

13. The method of claim 11 wherein the patient uses the extended handles by placing their arms through the extended handles.

* * * * *